(12) United States Patent
Haruyama

(10) Patent No.: US 10,444,569 B2
(45) Date of Patent: Oct. 15, 2019

(54) LIQUID CRYSTAL DISPLAY DEVICE AND ELECTRONIC APPARATUS

(71) Applicant: SEIKO EPSON CORPORATION, Tokyo (JP)

(72) Inventor: Akihide Haruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/034,808

(22) Filed: Jul. 13, 2018

(65) Prior Publication Data

US 2019/0033642 A1    Jan. 31, 2019

(30) Foreign Application Priority Data

Jul. 26, 2017  (JP) .................. 2017-144966

(51) Int. Cl.
*G02F 1/1335* (2006.01)
*G02F 1/13363* (2006.01)
(Continued)

(52) U.S. Cl.
CPC ........ *G02F 1/13363* (2013.01); *G02F 1/1337* (2013.01); *G02F 1/1368* (2013.01); *G02F 1/133345* (2013.01); *G02F 1/133512* (2013.01); *G02F 1/133526* (2013.01); *G02F 1/133528* (2013.01); *G02F 1/136286* (2013.01); *G09G 3/3648* (2013.01); *G09G 3/3677* (2013.01); *G09G 3/3688* (2013.01);
(Continued)

(58) Field of Classification Search
CPC ............. G02F 1/1335; G02F 1/133526; G02F 1/133512; G02F 1/1368; G02F 1/13363; G02F 1/133514; G02F 1/133528; G02F 1/136209; G02F 1/13; G02F 1/136; G02F 1/133509; G02F 1/1336; G02F 1/1333; G02F 1/1337; G02F 1/133635; G02F 1/133345; G02F 1/136286; G02F 2001/133638; G02F 2201/121; G02F 2201/123; G02B 27/2214; G02B 5/201; G02B 5/3083; G02B 5/003; G02B 1/041; G02B 3/0006; H04N 13/305; G09G 3/3648; G09G 3/3688; G09G 3/3677
See application file for complete search history.

(56) References Cited

U.S. PATENT DOCUMENTS 9,354,467 B2 * 5/2016 Nimura ............. G02F 1/133526
2017/0082893 A1 3/2017 Ito

FOREIGN PATENT DOCUMENTS

JP    2011-180487 A    9/2011
JP    2017-058537 A    3/2017

* cited by examiner

Primary Examiner — Thoi V Duong
(74) Attorney, Agent, or Firm — Oliff PLC

(57) ABSTRACT

Provided is a technique to suppress a decrease in the effect of optical compensation caused by diffraction at the element substrate in a liquid crystal display device. One aspect of a liquid crystal device includes a counter substrate that includes a common electrode, an element substrate that includes a pixel electrode, a lens, and a light-shielding member, the light-shielding member defining an opening area of a pixel, a liquid crystal layer interposed between the counter substrate and the element substrate, and an optical compensation member arranged on a counter substrate side with respect to the liquid crystal layer. Incident light is incident from the counter substrate side.

12 Claims, 9 Drawing Sheets

(51) Int. Cl.
   *G02F 1/1337*    (2006.01)
   *G02F 1/1362*    (2006.01)
   *G02F 1/1333*    (2006.01)
   *G09G 3/36*      (2006.01)
   *G02F 1/1368*    (2006.01)
(52) U.S. Cl.
   CPC ............ *G02F 2001/133638* (2013.01); *G02F 2201/121* (2013.01); *G02F 2201/123* (2013.01)

LIQUID CRYSTAL DISPLAY DEVICE AND ELECTRONIC APPARATUS

BACKGROUND

1. Technical Field

The disclosure relates to a liquid crystal display device and an electronic apparatus.

2. Related Art

Liquid crystal panels in which a liquid crystal layer is interposed between a counter substrate and an element substrate are used as, for example, light bulbs for projectors. An aspect in which light is made incident on the liquid crystal panel from the counter substrate side is frequently used.

The light passing through the liquid crystal layer has a phase difference due to the optical anisotropy of the liquid crystal layer. To compensate for that phase difference, optical compensation members are used. For example, JP-A-2011-180487 discloses a technique in which an optical compensation member is arranged outside an element substrate, and light passes through a counter substrate, a liquid crystal layer, and the element substrate in order and enters the optical compensation member. For successful optical compensation, it may be better to make the deviation of the travel direction of the light incident on the optical compensation member from the travel direction of the light incident on the liquid crystal layer small.

In the element substrate, a light-shielding member for defining an opening area of a pixel electrode is formed from, for example, wiring of a switching element. Light passing through such a fine opening area undergoes diffraction. The diffraction results in a change in the travel direction of the light.

In the technique disclosed in JP-A-2011-180487, the element substrate, specifically, the opening area defined by the light-shielding member of the element substrate is interposed between the liquid crystal layer and the optical compensation member, and the light passing through the liquid crystal layer is diffracted at the opening area of the element substrate and enters the optical compensation member. Accordingly, the travel direction of the light incident on the optical compensation member is deviated from the travel direction of the light incident on the liquid crystal layer, which may make it hard to heighten the effect of optical compensation.

SUMMARY

The disclosure provides a technique to suppress a decrease in the effect of optical compensation caused by the diffraction at the element substrate.

One aspect of a liquid crystal device according to the disclosure includes a counter substrate including a common electrode, an element substrate including a pixel electrode, a lens, and a light-shielding member, the light-shielding member defining an opening area of the pixel electrode, a liquid crystal layer interposed between the counter substrate and the element substrate, and an optical compensation member arranged on a counter substrate side with respect to the liquid crystal layer. Incident light is incident from the counter substrate side.

According to the aspect, neither the lens nor the light-shielding member is interposed between the optical compensation member and the liquid crystal layer, thus making the compensation using the optical compensation member is made successful.

In the one aspect of the liquid crystal display device described above, the counter substrate may include no light-shielding member defining the opening area of the pixel electrode. According to this aspect, since diffraction caused by the light-shielding member is suppressed, the compensation using the optical compensation member is made more successful.

In the one aspect of the liquid crystal display device described above, the counter substrate may include a light-transmissive base material arranged on a side opposite to the liquid crystal layer with respect to the common electrode. The optical compensation member may be arranged on a side opposite to the liquid crystal layer with respect to the base material. According to this aspect, as the optical compensation member arranged outside the counter substrate, a member prepared separately from the counter substrate is selected, as appropriate, to be used.

In the one aspect of the liquid crystal display device described above, the optical compensation member may be arranged to be separated from the base material. According to this aspect, the arrangement of the optical compensation member is easily adjusted.

In the one aspect of the liquid crystal display device described above, the optical compensation member may be arranged to be in contact with the base material. According to this aspect, the downsizing of the liquid crystal display device is facilitated.

In the one aspect of the liquid crystal display device described above, a dust-proof member arranged on a side opposite to the liquid crystal layer with respect to the counter substrate may be further included. The optical compensation member may be provided on a surface of the dust-proof member. According to this aspect, the surface of the dust-proof member is utilized for arranging the optical compensation member.

In the one aspect of the liquid crystal display device described above, the counter substrate may include a light-transmissive base material arranged on a side opposite to the liquid crystal layer with respect to the common electrode. The optical compensation member may be provided in the counter substrate such that the optical compensation member is provided on a liquid crystal layer side with respect to the base material. According to this aspect, the optical compensation member may not be prepared as a member separately from the counter substrate.

In the one aspect of the liquid crystal display device described above, a surface of the lens may be curved over an entirety of the opening area. According to this aspect, the light is efficiently condensed.

In the one aspect of the liquid crystal display device described above, the lens may be convex toward a liquid crystal layer side or convex toward a side opposite to the liquid crystal layer. According to this aspect, the lens to condense the light is available in a variety of types.

In the one aspect of the liquid crystal display device described above, the lens may be a spherical lens or an aspherical lens. According to this aspect, the lens to condense the light is available in a variety of types.

In the one aspect of the liquid crystal display device described above, the lens may be arranged on a liquid crystal layer side with respect to the light-shielding member. According to this aspect, the incident light is condensed in the opening area by the lens.

In the one aspect of the liquid crystal display device described above, the optical compensation member may include at least one of a C-plate, an O-plate, or an A-plate. According to this aspect, at least one of the C-plate, the O-plate, or the A-plate is available for optical compensation.

One aspect of an electronic apparatus according to the disclosure includes the liquid crystal display device.

According to this aspect, the electronic apparatus including the liquid crystal display device described above makes the optical compensation successful.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Some exemplary embodiments of the disclosure will be described in detail below with reference to the accompanying drawings. In each drawing, however, the dimensions and scale of each component are different from the actual ones as appropriate. Some exemplary embodiments described below, which are some specific examples of the disclosure, are subjected to a variety of technical limitations. However, the scope of the disclosure is not limited to those embodiments, unless specifically indicated in the following description.

First Exemplary Embodiment

A liquid crystal display device 10 according to a first exemplary embodiment of the disclosure will be described.

Figure 1:
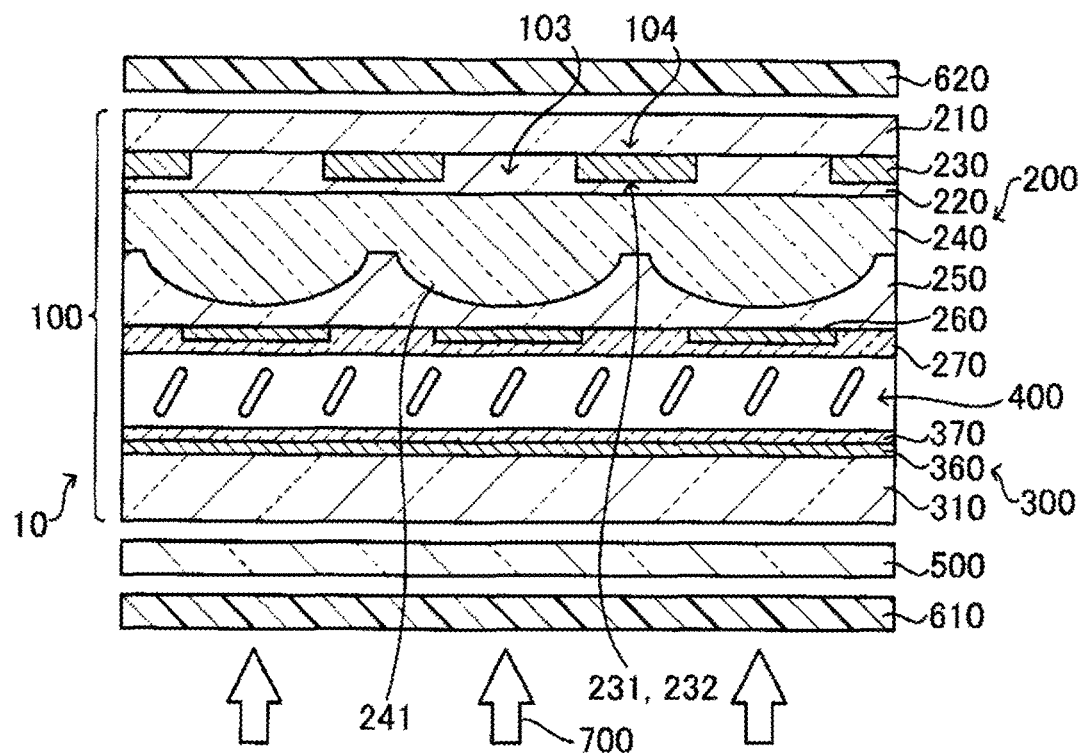
FIG. 1 is a schematic cross-sectional diagram illustrating one example of a configuration of a liquid crystal display device according to a first exemplary embodiment.
Figure 2:
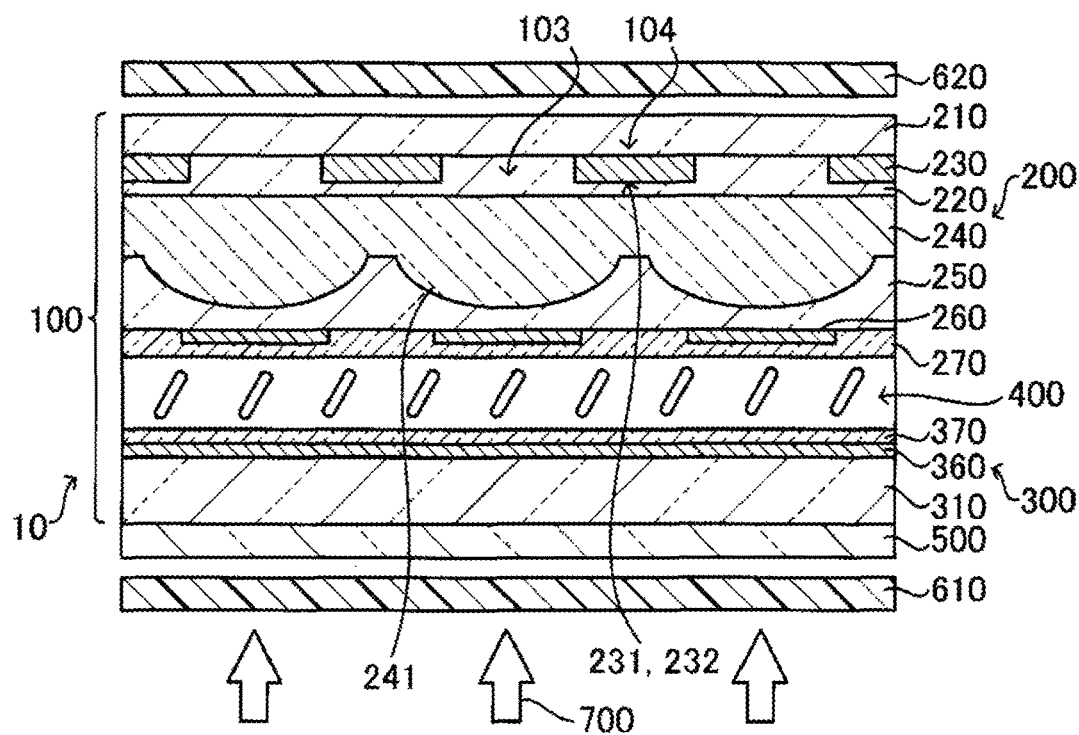
FIG. 2 is a schematic cross-sectional diagram illustrating another example of the configuration of the liquid crystal display device according to the first exemplary embodiment.

FIGS. 1 and 2 are schematic cross-sectional diagrams illustrating examples of the configuration of the liquid crystal display device 10 according to the first exemplary embodiment. The liquid crystal display device 10 includes a liquid crystal panel 100, an optical compensation member 500, a polarizing plate 610 and a polarizing plate 620.

First, the liquid crystal panel 100 will be described. The liquid crystal panel 100 includes an element substrate 200, a counter substrate 300 arranged to face the element substrate 200, and a liquid crystal layer 400 interposed between the element substrate 200 and the counter substrate 300.

Figure 3:
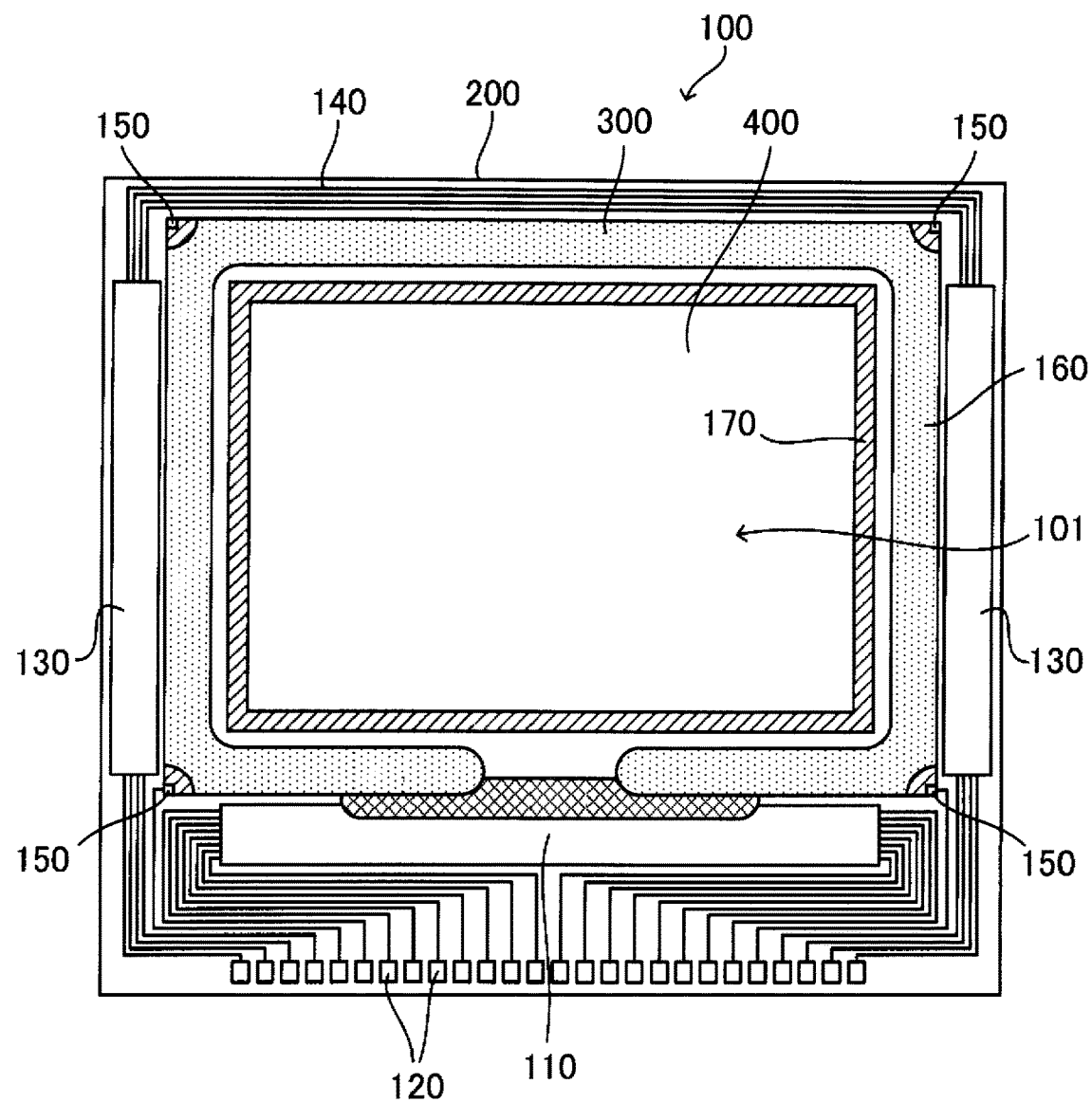
FIG. 3 is a schematic plan view illustrating a configuration of a liquid crystal panel.

Prior to describing a cross-sectional configuration of the liquid crystal panel 100, a schematic plan view and a schematic electrical configuration of the liquid crystal panel 100 will be described with reference to FIGS. 3 and 4. FIG. 3 is a schematic plan view illustrating an example of the configuration of the liquid crystal panel 100.

The element substrate 200 and the counter substrate 300 are bonded to each other via a seal material 160 arranged in a flame shape. The liquid crystal layer 400 is formed from liquid crystal which is enclosed in a space surrounded by the element substrate 200, the counter substrate 300, and the seal material 160 and which has positive or negative dielectric anisotropy.

The seal material 160 includes, for example, heat-curing or ultraviolet-curing epoxy resin. The seal material 160 is mixed with spacers to hold a constant space between the element substrate 200 and the counter substrate 300. Inside an area in which the seal material 160 is formed, a surrounding partition 170 including a light-shielding material is formed. The inside of the surrounding partition 170 corresponds to a display area 101 in which a plurality of pixels are arranged.

Outside the seal material 160, a data-line drive circuit 110 and an external-circuit mounting terminal 120 are provided along one side of the element substrate 200. Along two sides adjacent to the one side, scan-line drive circuits 130 are provided. On the other side of the element substrate 200, wirings 140 for connecting the scan-line drive circuits 130 on both sides are provided. In each corner of the counter substrate 300, an inter-substrate conducting material 150 for electrical conduction between the element substrate 200 and the counter substrate 300 is provided.

The liquid crystal panel 100 operates in, for example, the Twisted Nematic (TN) mode or the Vertical Alignment (VA) mode. The liquid crystal panel 100 is used as, for example, a transmissive display device that modulates light incident from the counter substrate 300 side and outputs the light to the element substrate 200 side.

Figure 4:
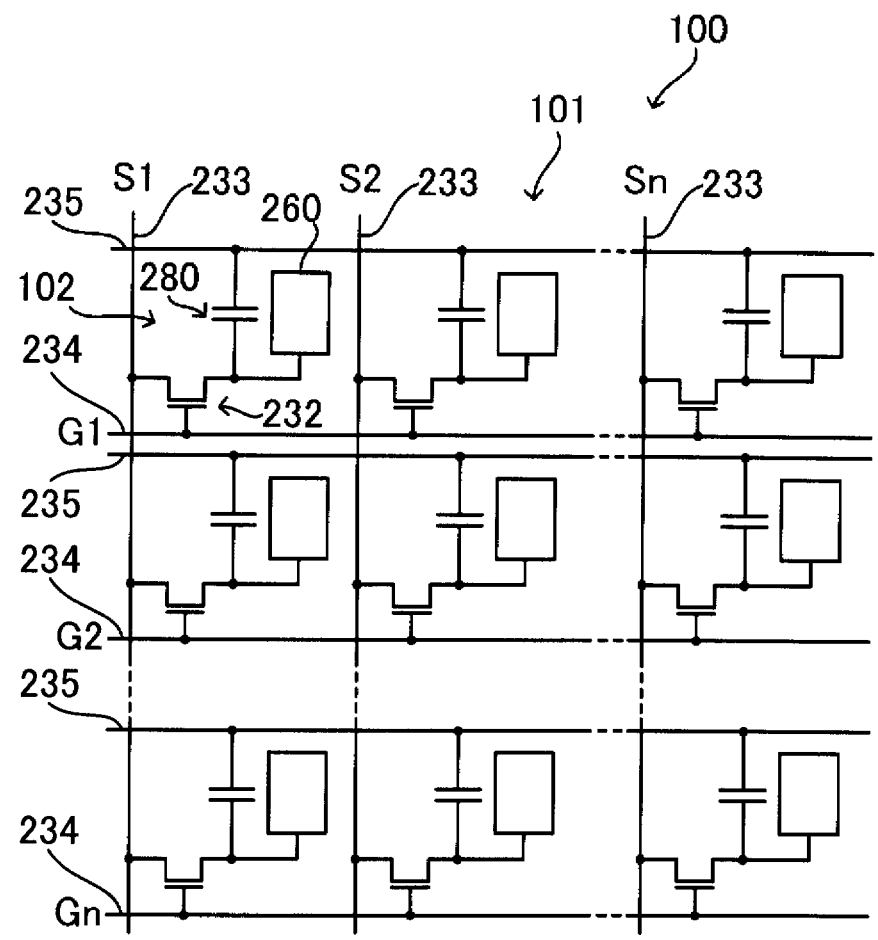
FIG. 4 is an equivalent circuit diagram illustrating an electrical configuration of the liquid crystal panel.

FIG. 4 is an equivalent circuit diagram illustrating an electrical configuration of the liquid crystal panel 100. In the display area 101, a plurality of pixels 102 are arranged in matrix. In each pixel 102, a pixel electrode 260 and a thin-film transistor (TFT) 232, which is a switching element, are provided. The source electrode of the TFT 232 is electrically connected to a data line 233 which extends from the data-line drive circuit 110. Image signals (data signals) S1, S2, . . . , Sn are supplied to the data line 233 from the data-line drive circuit 110 in a line-sequential manner. The gate electrode of the TFT 232 is electrically connected to a scan line 234 which extends from the scan-line drive circuit 130. Scan signals G1, G2, . . . , Gn are supplied to the scan line 234 from the scan-line drive circuit 130 in a line-sequential manner. The drain electrode of the TFT 232 is electrically connected to the corresponding pixel electrode 260.

The image signals S1, S2, ..., Sn are written to the pixel electrode 260 via the data line 233 at a predetermined timing by turning the TFT 232 on for a certain period. In this way, an image signal with a predetermined level written to the liquid crystal layer 400 via the pixel electrode 260 is held with a liquid crystal capacitor formed between the pixel electrode 260 and a common electrode 360 provided in the counter substrate 300 (see FIG. 1) for a certain period.

To prevent the held image signals S1, S2, ..., Sn from leaking, a storage capacitor 280 is formed between the pixel electrode 260 and a capacitor line 235 and is arranged in parallel to the liquid crystal capacitor. In this way, a voltage signal is applied to the liquid crystal of each pixel 102, the orientation of the liquid crystal changes depending on the level of the applied voltage, and thus the light incident on the liquid crystal layer 400 is modulated to enable gradation display.

Referring back to FIGS. 1 and 2, the cross-sectional configuration of the liquid crystal panel 100 will be described. A direction perpendicular to the counter substrate 300 (with respect to the base material 310 of the counter substrate 300) is referred to as a thickness direction. Viewing the liquid crystal panel 100 from the thickness direction is referred to as a plan view. In describing the thickness direction of the liquid crystal panel 100, for a simple explanation, the liquid crystal layer 400 side from the counter substrate 300 or the element substrate 200 is referred to as an upper side.

The counter substrate 300 includes the base material 310, the common electrode 360, and an alignment film 370. The base material 310 includes a light-transmissive material, such as glass and quartz. The common electrode 360 is formed on the base material 310. The common electrode 360 includes a conductive, light-transmissive material such as indium tin oxide (ITO) and indium zinc oxide (IZO). The alignment film 370 is formed on the common electrode 360. The alignment film 370 includes, for example, polyimide or silicon oxide.

The element substrate 200 includes a base material 210, an insulating layer 220, a non-opening area structure 230, a lens layer 240, an insulating layer 250, the pixel electrode 260, and an alignment film 270. The base material 210 includes a light-transmissive material that transmits visible light, such as glass and quartz. The insulating layer 220 is formed on the base material 210. The insulating layer 220 includes an insulating, light-transmissive material, such as silicon oxide.

The non-opening area structure 230 is provided in the insulating layer 220. A light-shielding member 231 which is formed in the insulating layer 220 and the TFT 232 are collectively referred to as the non-opening area structure 230. The non-opening area structure 230 is represented by a schematic, symbolic rectangle.

The light-shielding member 231 includes a plurality of light-shielding layers which are arranged spaced apart from each other in the thickness direction via the insulating layer 220. Each light-insulating layer includes a light-shielding material that shields visible light, such as polysilicon, metal, metal silicide, and metallic compound. The TFT 232 includes a semiconductor layer which includes a source area, a channel area, and a drain area of a transistor.

The light-shielding member 231 is, in a plan view, provided along the edge of each pixel electrode 260 so as to surround the pixel electrode 260. An area surrounded by the light-shielding member 231 is an opening area (light-transmissive area) 103 through which light passes in the pixel electrode 260 of each pixel 102. In this way, the light-shielding member 231 defines the opening area 103 of the pixel electrode 260.

In a plan view, the area where the light-shielding member 231 is provided is a non-opening area (light-shielding area) 104 through which light does not pass. As the light-shielding layer included in the light-shielding member 231, for example, the data line 233 or the scan line 234 may be used. The light-shielding layers included in the light-shielding member 231 include an overlapping portion in a planar view. The TFT 232 is provided in the non-opening area 104 so as to be interposed between the light-shielding layers in the thickness direction.

The lens layer (microlens) 240 is formed on the insulating layer 220. The insulating layer 250 is formed on the lens layer 240. The lens layer 240 includes a light-transmissive material, such as silicon oxynitride, whose refractive index for visible light is higher than the refractive index of a material forming the insulating layer 250. The insulating layer 250 includes an insulating, light-transmissive material, such as silicon oxide.

The lens layer 240 includes a plurality of lenses 241. The lens 241 is provided for each pixel electrode 260. Each lens 241 is convex toward the insulating layer 250 side (that is, the liquid crystal layer 400 side). A surface of each lens 241 is curved over the entirety of the opening area 103 in a plan view.

The pixel electrode 260 is provided on the insulating layer 250. The pixel electrode 260 includes a conductive, light-transmissive material, such as ITO and IZO. The alignment film 270 is provided on the insulating layer 250 covering the pixel electrode 260. The alignment film 270 includes, for example, polyimide or silicon oxide.

Next, a configuration of the entire liquid crystal display device 10 will be described. The polarizing plate 610 and the polarizing plate 620 are arranged so that the liquid crystal panel 100 is interposed between the polarizing plates. The polarizing plate 610 is arranged on the side opposite to the liquid crystal layer 400 with respect to the counter substrate 300, and the polarizing plate 620 is arranged on a side opposite to the liquid crystal layer 400 with respect to the element substrate 200. The optical compensation member 500 is arranged between the polarizing plate 610 and the liquid crystal panel 100.

Incident light 700 is incident on the liquid crystal display device 10 from the polarizing plate 610 side. The incident light 700 emerging from the polarizing plate 610 passes though the optical compensation member 500 and enters the liquid crystal panel 100. The incident light 700 is incident on the liquid crystal panel 100 from the counter substrate 300 side, is modulated by the liquid crystal layer 400, and is output from the element substrate 200 side. Further, the incident light 700 passing through the liquid crystal panel 100 emerges from the polarizing plate 620 side.

Light transmission in the liquid crystal panel 100 will be described in detail. The incident light 700 passing through the optical compensation member 500 further passes through the base material 310, the common electrode 360, and the alignment film 370 of the counter substrate 300, and enters the liquid crystal layer 400. The incident light 700 passing through the liquid crystal layer 400 further passes through the alignment film 270, the pixel electrode 260, and the insulating layer 250 of the element substrate 200, enters the lens layer 240, and is condensed by the lens 241. The incident light 700 condensed by the lens 241 enters the insulating layer 220, passes through the opening area 103, and is output from the base material 210.

The liquid crystal layer 400 has optical anisotropy, this the incident light 700 passing through the liquid crystal layer 400 has a phase difference (phase retardation). The optical compensation member 500 compensates for the phase difference of the incident light 700 caused by the light transmission through the liquid crystal layer 400. As the optical compensation member 500, various types of members, such as a C-plate, an O-plate, and an A-plate, may be used as appropriate.

The respective types are defined relative to a refractive index ellipsoid (three dimensional distribution of refractive index) as follows. It is assumed that coordinate axises in a plate plane are X- and Y-axis and the plate normal is Z-axis. It is also assumed that a main refractive index in the X-axis direction is Nx, a main refractive index in the Y-axis direction is Ny, and a main refractive index in the Z-axis direction is Nz. The A-plate (positive A-plate) satisfies Nx>Ny=Nz. The C-plate (negative C-plate) satisfies Nx=Ny>Nz. In the O-plate, the refractive index ellipsoid itself is tilted with respect to the plate. For example, the O-plate is tilted about Y-axis as a rotation axis at a certain angle with respect to the plate normal under the condition of Nx>Ny>Nz. When viewed from the plate normal, the slow axis in the cross section of the ellipsoid, taken in the XY plane, is the Y-axis direction. The O-plate is not limited to the above conditions, but the Y-axis direction may be the fast axis depending on the shape of the ellipsoid and its tilt.

In the liquid crystal display device 10, a phase difference caused by any factor other than the liquid crystal layer 400, for example, a phase difference caused by constituent elements of the polarizing plates 610 and 620, may occur. The optical compensation member 500 may compensate for a total phase difference including not only a phase difference caused by the light transmission through the liquid crystal layer 400 but also a phase difference caused by other various factors. Compensating for the phase difference using the optical compensation member 500 enables the contrast of the liquid crystal display device 10 to be increased.

The lens 241 that condenses light enables the incident light 700 to efficiently enter the opening area 103 of each pixel 102. The surface of the lens 241 is curved over the entirety of the opening area 103 in a plan view. In other words, the lens 241 has a light-condensing function for the entirety of the opening area 103. The light-condensing function enables light to be efficiently condensed (as compared to an aspect in which a flat portion having no light-condensing function is formed in the opening area 103).

Figure 13:
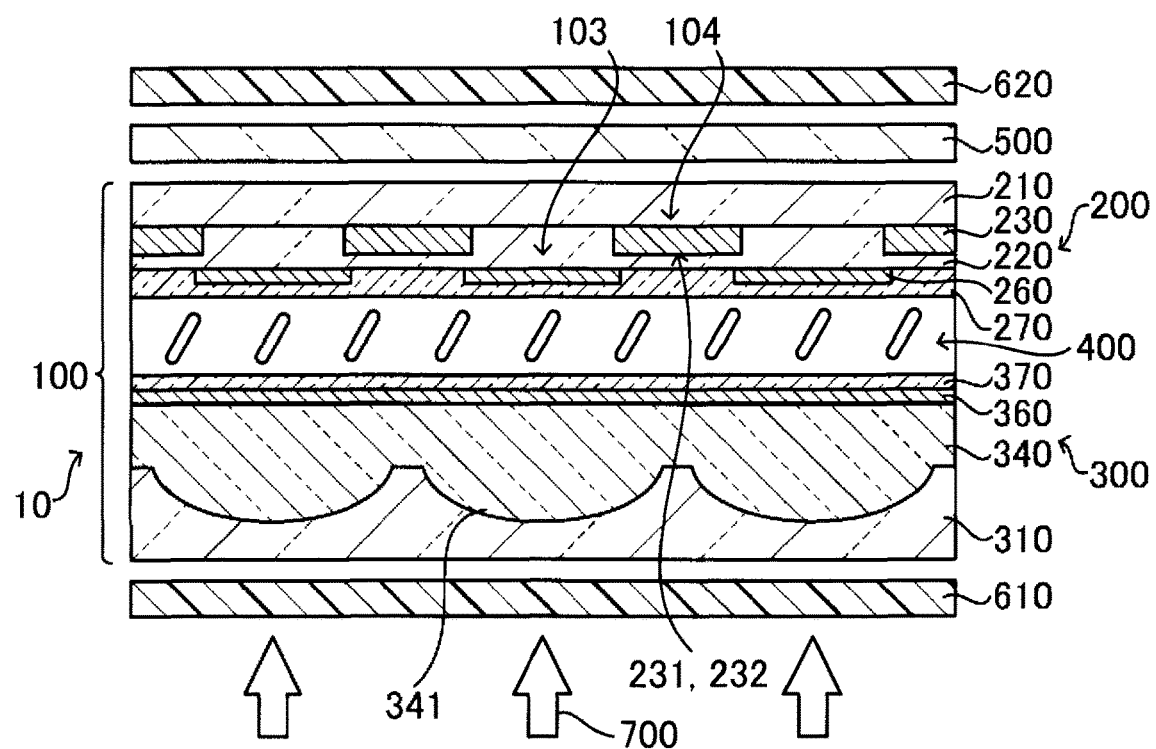
FIG. 13 is a schematic cross-sectional diagram illustrating a configuration of a liquid crystal display device according to a comparative embodiment.

Here, a liquid crystal display device 10 according to a comparative embodiment will be described below. FIG. 13 is a schematic cross-sectional diagram illustrating a configuration of the liquid crystal display device 10 according to the comparative embodiment. The liquid crystal display device 10 according to the comparative embodiment differs from the liquid crystal display device 10 according to the first exemplary embodiment in that an optical compensation member 500 is arranged between a liquid crystal panel 100 and a polarizing plate 620 and an element substrate 200 does not include a lens layer 240 but a counter substrate 300 includes a lens layer (microlens) 340.

In the comparative embodiment, incident light 700 passing through a polarizing plate 610 enters a base material 310 of the counter substrate 300 and is condensed by a lens 341 of the lens layer 340. The incident light 700 condensed by the lens 341 passes through a common electrode 360 and an alignment film 370 and enters a liquid crystal layer 400. The incident light 700 passing through the liquid crystal layer 400 passes through an alignment film 270 and a pixel electrode 260 of the element substrate 200, enters an insulating layer 220, passes through an opening area 103, and is output from a base material 210. The incident light 700 output from the base material 210 passes through the optical compensation member 500 and enters the polarizing plate 620.

Even in the comparative embodiment, light condensing by the lens 341 enables the incident light 700 to enter the opening area 103 of each pixel 102, and the optical compensation member 500 enables the phase difference to be compensated.

Generally, the smaller the deviation of the travel direction of the light incident on the optical compensation member 500 from the travel direction of the light incident on the liquid crystal layer 400 is, the more successful the compensation for the phase difference can be done by using the optical compensation member 500. Refraction involved in the light condensing by the lens 241 or 341, or diffraction involved in the light transmission through the fine opening area 103 results in a change in the travel direction of the incident light 700. For this reason, in the thickness direction of the liquid crystal display device 10, the lens 241, the lens 341, or a light-shielding member 231 for defining the opening area 103 may not be interposed between the optical compensation member 500 and the liquid crystal layer 400.

In the comparative Embodiment, the counter substrate 300 includes the lens 341. Accordingly, in a case where the optical compensation member 500 is arranged between the polarizing plate 610 and the liquid crystal panel 100, that is, on the light incident side of the liquid crystal panel 100, the lens 341 is interposed between the optical compensation member 500 and the liquid crystal layer 400. In the comparative embodiment, the optical compensation member 500 is arranged between the liquid crystal panel 100 and the polarizing plate 620, that is, on the light output side of the liquid crystal panel 100, so that the lens 341 is prevented from being placed between the liquid crystal layer 400 and the optical compensation member 500.

In the comparative embodiment, however, the light-shielding member 231 for defining the opening area 103 is interposed between the liquid crystal layer 400 and the optical compensation member 500. As a result, the diffraction caused by the light transmission through the opening area 103 causes a deviation of the travel direction of the light incident on the optical compensation member 500 from the travel direction of the light incident on the liquid crystal layer 400, thus making it hard to heighten the effect of optical compensation.

In contrast, in the first exemplary embodiment, the element substrate 200 includes the lens 241.

Accordingly, in a case where the optical compensation member 500 is arranged between the liquid crystal panel 100 and the polarizing plate 620, that is, on the light output side of the liquid crystal panel 100, the lens 241 is interposed between the liquid crystal layer 400 and the optical compensation member 500. In the first exemplary embodiment, the optical compensation member 500 is arranged between the polarizing plate 610 and the liquid crystal panel 100, that is, on the light incident side of the liquid crystal panel 100, so that the lens 241 is prevented from being placed between the optical compensation member 500 and the liquid crystal layer 400.

Further, in the first exemplary embodiment, the optical compensation member 500 is arranged on the light incident side of the liquid crystal panel 100, that is, the optical compensation member 500 is arranged on the counter substrate 300 side with respect to the liquid crystal layer 400, so that the light-shielding member 231 for defining the opening area 103 is prevented from being placed between the optical compensation member 500 and the liquid crystal layer 400.

In this way, in the first exemplary embodiment, neither the lens 241 nor the light-shielding member 231 for defining the opening area 103 is interposed between the optical compensation member 500 and the liquid crystal layer 400. Both a deviation of the travel direction of the light incident on the optical compensation member 500 from the travel direction of the light incident on the liquid crystal layer 400 caused by the refraction at the lens 241 and the diffraction at the opening area 103 are prevented. Thus, the compensation using the optical compensation member 500 is made successful.

In addition, the liquid crystal layer 400 is not interposed between the non-opening area structure 230 and the lens layer 240, so that variations in brightness and contrast due to variation in assembly (assembly error) in substrate bonding are eliminated. Specifically, an assembly error causes a deviation of the lens layer 240 from the center of the opening area 103, increasing the possibility of the incident light hitting on the non-opening area structure 230, thus preventing an expected amount of light to pass through. This results in a reduced brightness. Furthermore, an increase in a component of polarization canceled due to the non-opening area structure 230 increases an amount of light leakage in displaying black. This results in a reduced contrast. Accordingly, the configuration of the first exemplary embodiment has almost no variation in characteristics due to assembly processes.

In the technologies of liquid crystal device, there is known a structure in which a light-shielding member for defining an opening area of a pixel electrode (a light-shielding member formed along the edge of the pixel electrode in a planar view) is provided in a counter substrate. However, in the first exemplary embodiment, in a case where such a light-shielding member is provided in the counter substrate 300, a structure to cause diffraction is interposed between the optical compensation member 500 and the liquid crystal layer 400. In this regard, in the first exemplary embodiment, the counter substrate 300 may include no light-shielding member for defining the opening area 103 of the pixel electrode 260. This configuration prevents diffraction caused by the light-shielding member from occurring, thus making the compensation using the optical compensation member 500 more successful.

As can be seen from the above description, in the first exemplary embodiment, the counter substrate 300 may include no lens for condensing the incident light 700 on the opening area 103 of the pixel electrode 260. This configuration prevents refraction caused by the lens from occurring, thus making the compensation using the optical compensation member 500 more successful.

In the first exemplary embodiment, the optical compensation member 500 is arranged on the light incident side of the liquid crystal panel 100. When applied to a projector as described later, this arrangement makes the distance from the liquid crystal panel 100 to a projection lens (projector lens) of a projection optical system (back focus) shorter, as compared to the comparative embodiment in which the optical compensation member 500 is arranged on the light output side of the liquid crystal panel 100. Such a shorter back focus prevents the light output from the liquid crystal panel 100 from spreading, thus allowing the projection lens to be downsized.

In addition, arranging the optical compensation member 500 on the light incident side of the liquid crystal panel 100 makes it easy to ensure a large space for the optical compensation member 500 while preventing the back focus from being longer. In other words, the space between the liquid crystal panel 100 and the polarizing plate 610 is designed to be as large as needed so that the optical compensation member 500 is arranged in the space. Ensuring a large space for the optical compensation member 500 allows high flexibility in the selection and arrangement of the optical compensation member 500 to be used.

FIG. 1 illustrates one example of the configuration of the liquid crystal display device 10 according to the first exemplary embodiment in which the optical compensation member 500 is arranged to be separated from the base material 310 of the counter substrate 300. Arranging the optical compensation member 500 separated from the base material 310 facilitates adjustment of the position (e.g., posture) of the optical compensation member 500.

FIG. 2 illustrates another example of the configuration of the liquid crystal display device 10 according to the first exemplary embodiment in which the optical compensation member 500 is arranged to be in contact with the base material 310 of the counter substrate 300. In the other example, the optical compensation member 500 may be bonded with the base material 310. Arranging the optical compensation member 500 in contact with the base material 310 provides the optical compensation member 500 and the counter substrate 300 as one structural member (makes the space between the base material 310 and the polarizing plate 610 smaller), thus facilitating downsizing of the liquid crystal display device 10.

In the first exemplary embodiment, an aspect where the optical compensation member 500 is arranged on the side opposite to the liquid crystal layer 400 with respect to the base material 310, that is, the optical compensation member 500 is arranged outside the counter substrate 300 is exemplified. In that aspects, as the optical compensation member 500, a member prepared separately from the counter substrate 300 is selected, as appropriate, to be used.

Next, a more detailed configuration of the optical compensation member 500 according to the first exemplary embodiment will be described. FIGS. 5 to 8 are schematic cross-sectional diagrams illustrating a first configuration example to a fourth configuration example, respectively.

Figure 5:
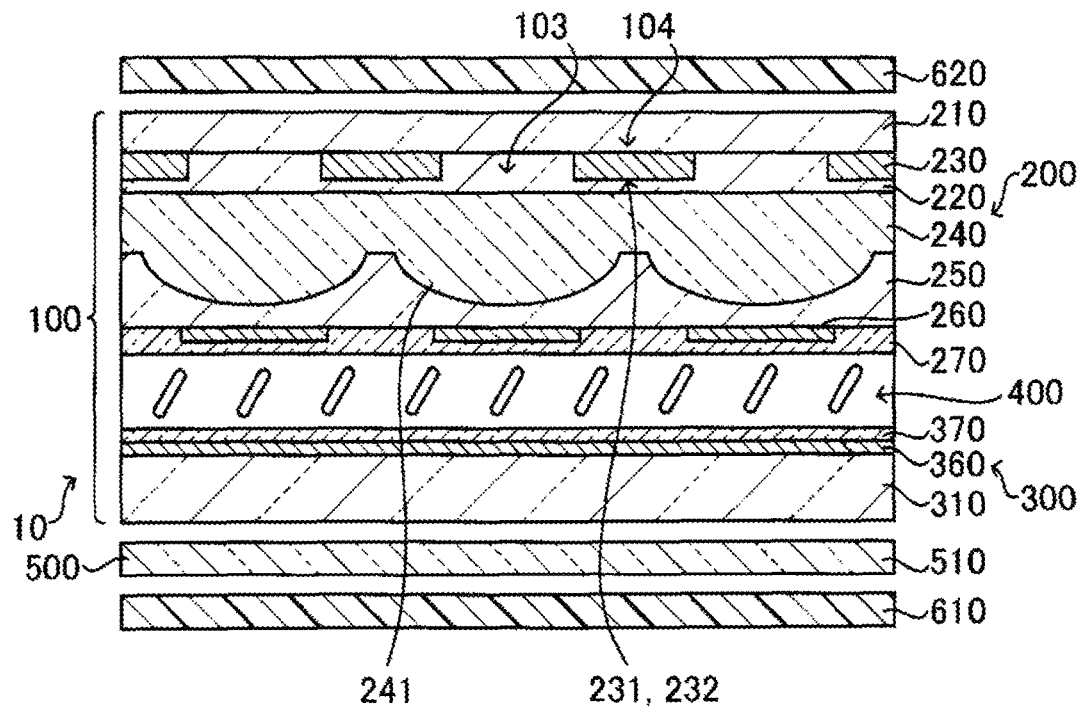
FIG. 5 is a schematic cross-sectional diagram illustrating a first configuration example of the first exemplary embodiment.

Refer to FIG. 5. As the optical compensation member 500 according to the first configuration example, a C-plate 510 is used. The C-plate 510 is arranged in parallel with respect to the base material 310 (placed flat). An aspect in which the optical compensation member 500 according to the comparative embodiment (see FIG. 13) is a C-plate arranged in parallel with respect to the base material 210 (placed flat) is referred to as a first comparative example. The liquid crystal display device 10 according to the first comparative example has, for example, a contrast of 1000, while the liquid crystal display device 10 according to the first configuration example has, for example, a contrast of 1400, which indicates that the first configuration example has an increased contrast which is 1.4 times the contrast of the first comparative example.

Figure 6:
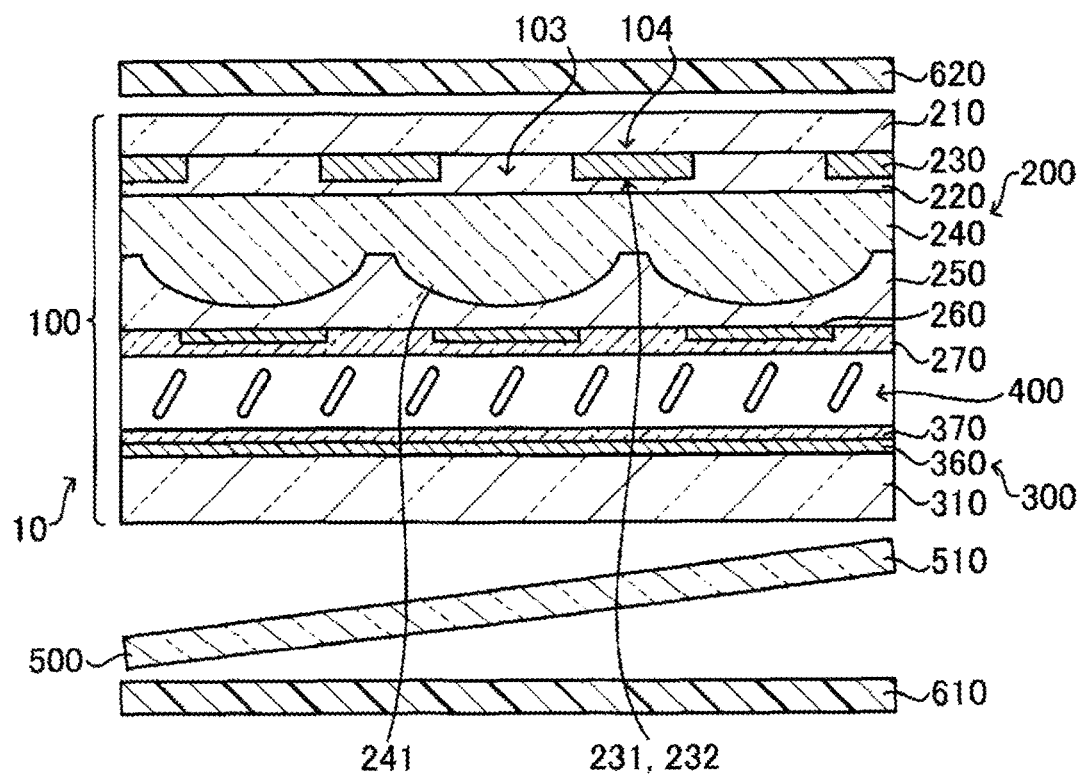
FIG. 6 is a schematic cross-sectional diagram illustrating a second configuration example of the first exemplary embodiment.

Refer to FIG. 6. As the optical compensation member 500 according to a second configuration example, a C-plate 510 is used. The C-plate 510 is arranged to be inclined to the base material 310. An aspect in which the optical compensation member 500 according to the comparative embodiment (see FIG. 13) is a C-plate arranged to be inclined to the base material 210 is referred to as a second comparative example. The liquid crystal display device 10 according to Comparative Example 2 has, for example, a contrast of 2300, while the liquid crystal display device 10 according to the second configuration example has, for example, a contrast of 8000, which indicates that the second configuration example has an increased contrast which is 3.5 times the contrast of the second comparative example.

The inclined C-plate 510 may be used as the optical compensation member 500 for the liquid crystal display device 10 that includes the liquid crystal layer 400 including liquid crystals with pretilt and operates in the VA mode, in particular.

As in the second comparative example, arranging the inclined C-plate 510 on the light output side of the liquid crystal panel 100 makes the back focus longer. In the second configuration example, since the optical compensation member 500 is arranged on the light incident side of the liquid crystal panel 100, the inclined C-plate 510 is arranged without making the back focus longer.

Figure 7:
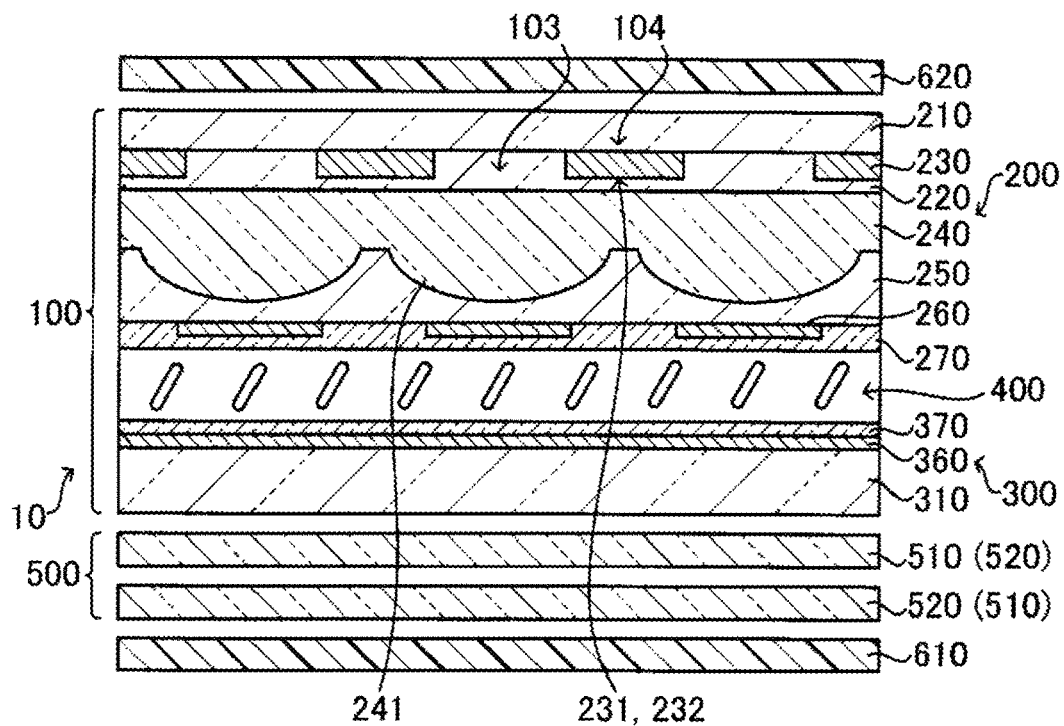
FIG. 7 is a schematic cross-sectional diagram illustrating a third configuration example of the first exemplary embodiment.

Refer to FIG. 7. As the optical compensation member 500 according to a third configuration example, a C-plate 510 and an O-plate 520 are used overlapping with each other. An aspect in which the optical compensation member 500 according to the comparative embodiment (see FIG. 13) is a C-plate and an O-plate used overlapping with each other is referred to as the third comparative example. The liquid crystal display device 10 according to the third comparative example has, for example, a contrast of 1350, while the liquid crystal display device 10 according to the third configuration example has, for example, a contrast of 2700, which indicates that the third configuration example has an increased contrast which is twice the contrast of the third comparative example.

In this aspect, the position of the O-plate 520 is adjusted by rotating the O-plate 520 about the normal direction of the base material 310 so that the contrast becomes maximum. The order of arranging the C-plate 510 and the O-plate 520 in the thickness direction may be reversed as needed.

Figure 8:
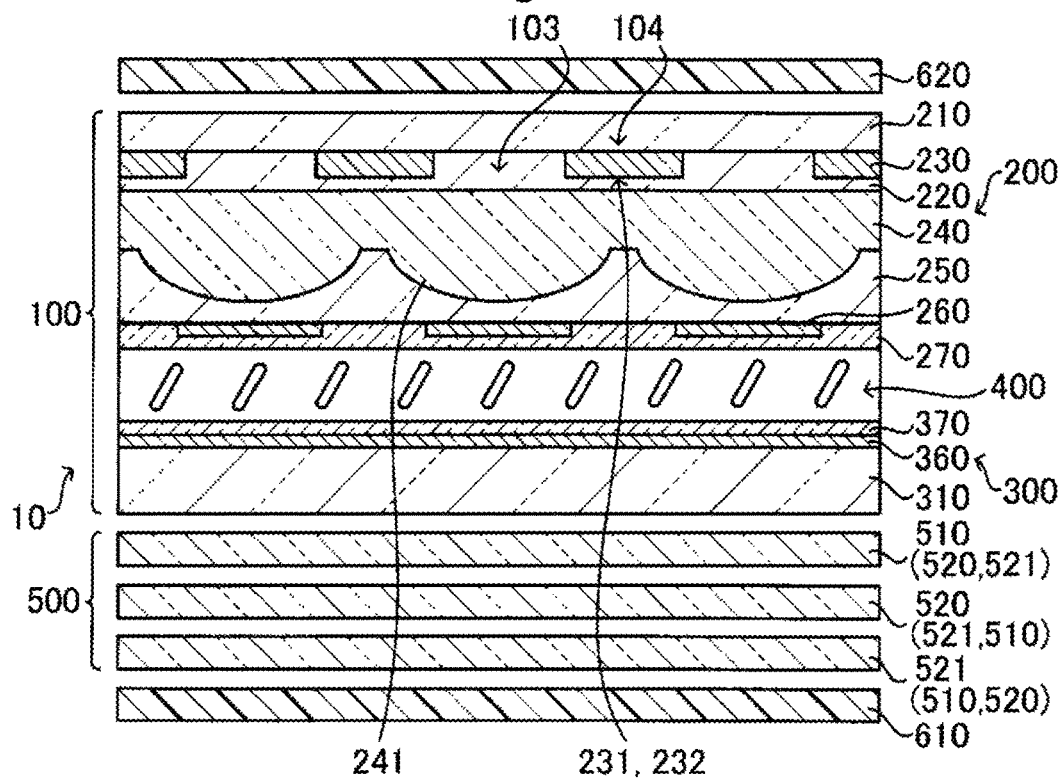
FIG. 8 is a schematic cross-sectional diagram illustrating a fourth configuration example of the first exemplary embodiment.

Refer to FIG. 8. As the optical compensation member 500 according to a fourth configuration example, a C-plate 510 and two O-plates 520 and 521 are used overlapping with each other. An aspect in which the optical compensation member 500 according to the comparative embodiment (see FIG. 13) is a C-plate and two O-plates are used overlapping with each other is referred to as a fourth comparative example. The liquid crystal display device 10 according to the fourth comparative example has, for example, a contrast of 1800, while the liquid crystal display device 10 according to the fourth configuration example has, for example, a contrast of 4500, which indicates that the fourth configuration example has an increased contrast which is 2.5 times the contrast of the fourth comparative example.

In this aspect, the position of the O-plate 520 and the O-plate 521 is adjusted by rotating at least one of the O-plate 520 or the O-plate 521 about the normal direction of the base material 310 so that the contrast becomes maximum. The order of arranging the C-plate 510, the O-plate 520, and the O-plate 521 in the thickness direction may be changed as needed.

The disclosure is not limited to the first exemplary embodiment described above, and is applicable to other exemplary embodiments or modified in a variety of forms, as described below. Further, the other exemplary embodiments or each of the modification forms described below may be combined, as appropriate, with any one or some of the others as selected.

First Modified Example of First Exemplary Embodiment

Figure 9:
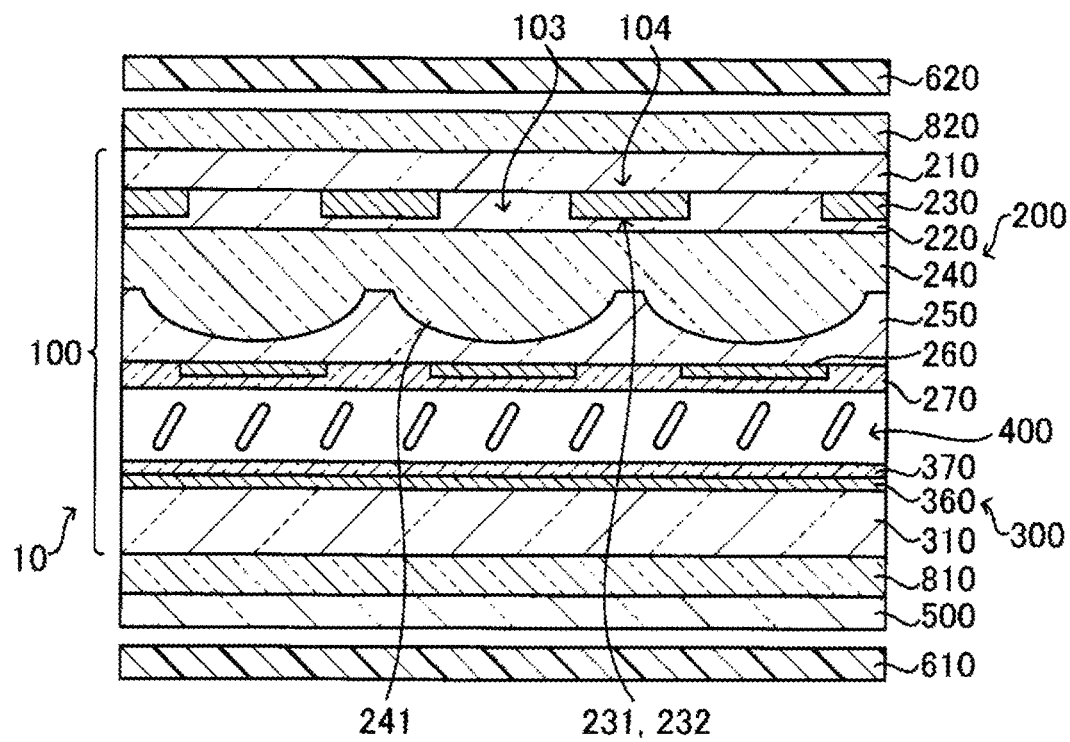
FIG. 9 is a schematic cross-sectional diagram illustrating a first modified example of the first exemplary embodiment.

FIG. 9 is a schematic cross-sectional diagram illustrating an example of a configuration of a liquid crystal display device 10 according to a first modified example of the first exemplary embodiment. The liquid crystal display device 10 according to the first modified example includes dust-proof glasses 810 and 820 (dust-proof members) on an opposite surface of the counter substrate 300 (base material 310) with respect to the liquid crystal layer 400 and on an opposite surface of the element substrate 200 (base material 210) with respect to the liquid crystal layer 400, respectively. The optical compensation member 500 is provided on an opposite surface of the dust-proof glass 810 with respect to the liquid crystal layer 400. The dust-proof glasses 810 and 820 prevent dust from adhering to the base materials 310 and 210 of the liquid crystal panel 100 (from being imaged on a display image).

In the first modified example, the surface of the dust-proof glass 810 is utilized for arranging the optical compensation member 500. As another arrangement, the optical compensation member 500 may be provided on a surface of the dust-proof glass 810 on the liquid crystal layer 400 side. In other words, the dust-proof glass 810 may be provided on a surface of the liquid crystal panel 100 on the light incident side via the optical compensation member 500.

Second Modified Example of First Exemplary Embodiment

Figure 10:
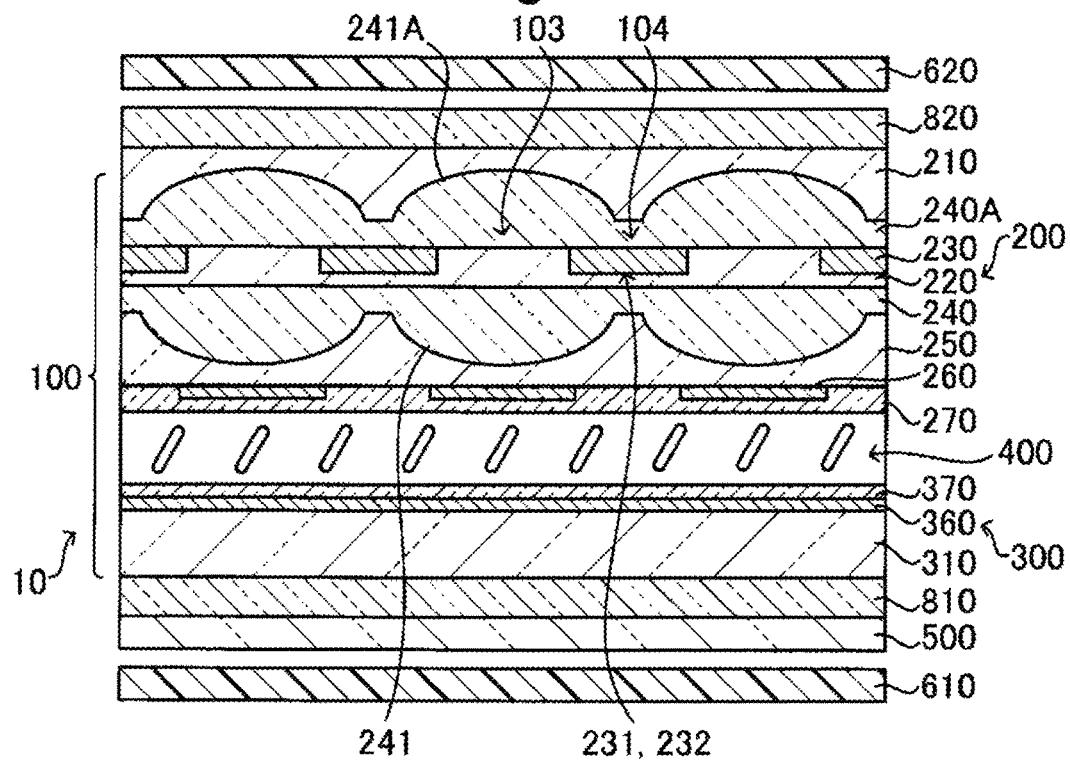
FIG. 10 is a schematic cross-sectional diagram illustrating a second modified example of the first exemplary embodiment.

FIG. 10 is a schematic cross-sectional diagram illustrating an example of a configuration of a liquid crystal display device 10 according to a second modified example of the first exemplary embodiment. The liquid crystal display device 10 according to the second modified example includes a lens layer 240A as well as the lens layer 240 on the element substrate 200. The lens layer 240A includes a plurality of lenses 241A. The lens 241A is provided to each pixel electrode 260. Each lens 241A is convex toward the base material 210 side, that is, the side opposite to the liquid crystal layer 400, and a surface of the lens 241A is curved over the entirety of the opening area 103 in a planar view.

In the way according to the second modified example, a plurality of lens layered in the element substrate 200 provides a high light-condensing performance, for example, thus preventing the light output from the liquid crystal panel 100 from spreading. The lens provided in the element substrate 200 may be convex toward the liquid crystal layer 400 side or convex toward the side opposite to the liquid crystal layer 400, and may also be a spherical lens or an aspherical lens. In this way, the lens to condense the light is available in a variety of types.

The position of the lens in the element substrate 200 in the thickness direction may be on the liquid crystal layer 400 side with respect to the light-shielding member 231 or on the side opposite to the liquid crystal layer 400. In view of condensing the incident light 700 incident from the counter substrate 300 side to the opening area 103, it is better to arrange the lens to be on the liquid crystal layer 400 side with respect to the light-shielding member 231, that is, the light incident side.

Second Exemplary Embodiment

Figure 11:
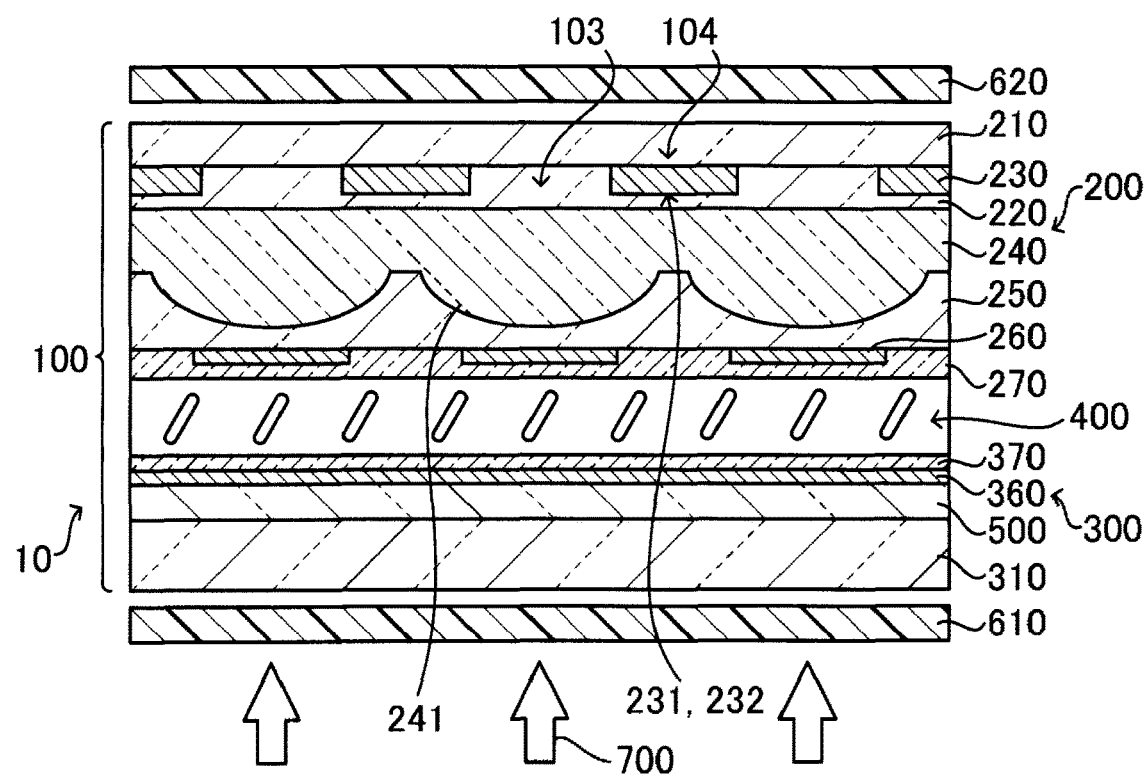
FIG. 11 is a schematic cross-sectional diagram illustrating a configuration of a liquid crystal display device according to a second exemplary embodiment.

A liquid crystal display device 10 according to a second exemplary embodiment will be described. FIG. 11 is a schematic cross-sectional diagram illustrating an example of a configuration of the liquid crystal display device 10 according to the second exemplary embodiment. The liquid crystal display device 10 according to the second exemplary embodiment differs from the first exemplary embodiment in that the optical compensation member 500 is arranged on the liquid crystal layer 400 side with respect to the base material 310.

For example, the optical compensation member 500 is formed as an optical compensation layer on the base material 310, and the counter substrate 360 is formed on the optical compensation member 500. As the optical compensation member 500, various types of members, such as a C-plate, an O-plate, and an A-plate, may be used as appropriate. The optical compensation member (optical compensation layer) 500 is formed using various types of film deposition techniques as appropriate.

It is preferable that arranging the optical compensation member 500 on the side opposite to the liquid crystal layer 400 with respect to the common electrode 360 prevents a voltage applied to the liquid crystal layer 400 from dropping in such an arrangement that the optical compensation member 500 causes a division of capacitance.

In the second exemplary embodiment, as in the first exemplary embodiment, neither the lens 241 nor the light-shielding member 231 is interposed between the optical compensation member 500 and the liquid crystal layer 400, thus making the compensation using the optical compensation member 500 is successful.

In the second exemplary embodiment, the optical compensation member 500 is arranged on the liquid crystal layer 400 side with respect to the base material 310. In other words, the optical compensation member 500 is arranged inside the counter substrate 300. In this arrangement, the optical compensation member 500 may not be prepared as a member separately from the counter substrate 300. In addition, the optical compensation member 500 of the first exemplary embodiment, which is arranged outside the counter substrate 300, may be used in combination.

Application Example

Figure 12:
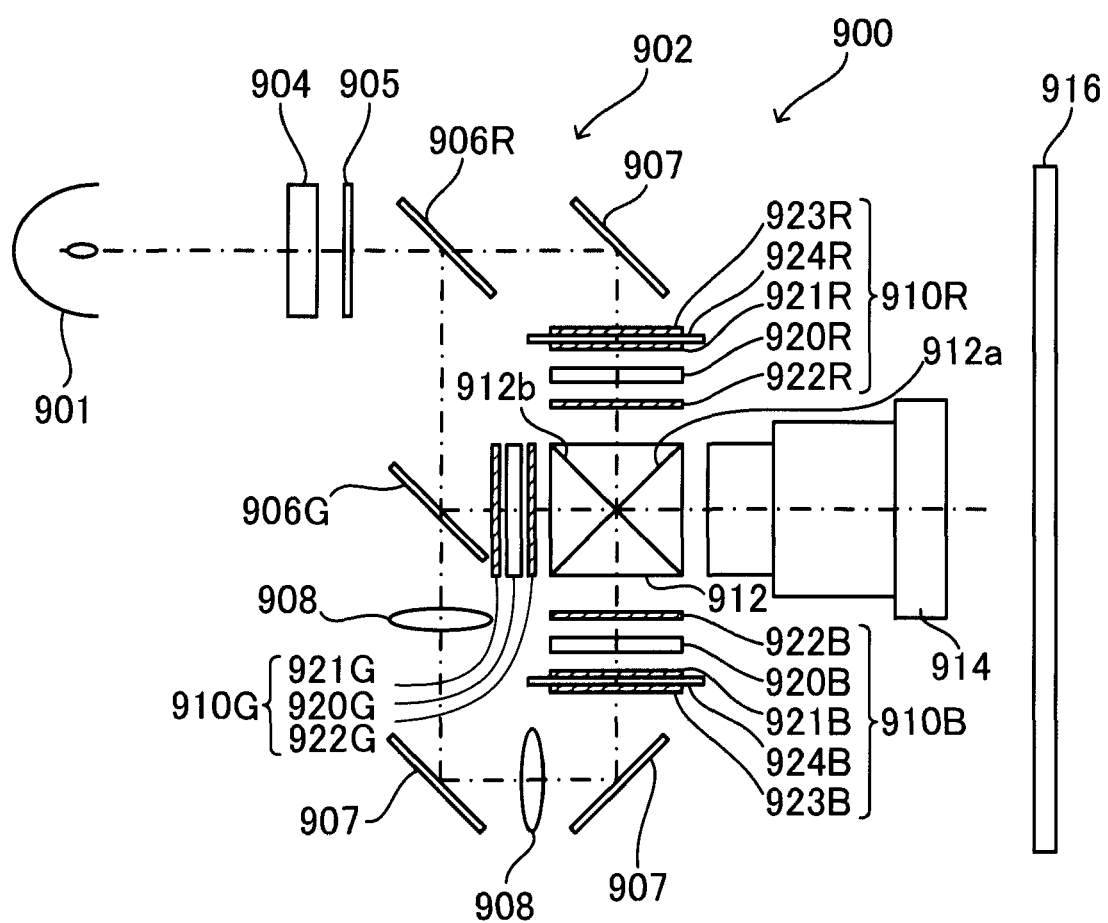
FIG. 12 is a schematic diagram illustrating an optical system of a projector as an application example.

Next, a projection display device (projector) as an application example of the liquid crystal display device 10 according to the exemplary embodiments and modified examples described above, will be described. FIG. 12 is a schematic diagram illustrating an example of an optical system of a projector 900 as the application example. The projector 900 includes a light source device 901, an integrator 904, a polarization conversion element 905, a color split guide optical system 902, an optical modulation device including a liquid crystal optical-modulation device 910R, a liquid crystal optical-modulation device 910G, and a liquid crystal optical-modulation device 910B, a cross dichroic prism 912, and a projection optical system 914. The liquid crystal optical-modulation devices 910R, 910G, and 910B include liquid crystal panels 920R, 920G, and 920B, respectively as described later.

A structure which is a combination of the liquid crystal panel 100 and the optical compensation member 500 described above is applied to each of the liquid crystal panels 920R, 920G, and 920B. The optical compensation member 500 may be arranged outside the liquid crystal panel 100 as in the first exemplary embodiment or be arranged inside the liquid crystal panel 100 as in the second exemplary embodiment. To avoid a complicated explanation, the structure of the combination of the liquid crystal panel 100 and the optical compensation member 500 is referred to as a "liquid crystal panel" (920R, 920G, or 920B).

The light source device 901 outputs light including red light as a first color light (hereinafter, "R-light"), green light as a second color light (hereinafter, "G-light"), and blue light as a third color light (hereinafter, "B-light"). As the light source device 901, for example, a super-high pressure mercury lamp may be used.

The integrator 904 makes an illuminance distribution of the light emitted from the light source device 901 uniform. The light whose illuminance distribution is made uniformed is converted into polarized light oscillating in a specific direction by the polarization conversion element 905, for example, to s-polarized light subjected to s-polarization with respect to a reflecting surface of the color split guide optical system 902. The light converted into s-polarized light enters an R-light transmission dichroic mirror 906R constituting the color split guide optical system 902.

The color split guide optical system 902 includes the R-light transmission dichroic mirror 906R, the B-light transmission dichroic mirror 906G, three reflecting mirrors 907, and two relay lenses 908.

The R-light transmission dichroic mirror 906R transmits the R-light but reflects the G-light and the B-light. The R-light passing through the R-light transmission dichroic mirror 906R enters the reflecting mirror 907.

The reflecting mirror 907 bends the light path of the R-light by 90 degrees. The R-light whose light path has been bent enters the R-light liquid crystal optical-modulation device 910R. The R-light liquid crystal optical-modulation device 910R is a transmissive liquid crystal device configured to modulate the R-light based on an image signal.

The R-light liquid crystal optical-modulation device 910R includes a λ/2 retardation plate 923R, a glass plate 924R, a first polarizing plate 921R, the liquid crystal panel 920R, and a second polarizing plate 922R. The λ/2 retardation plate 923R and the first polarizing plate 921R are arranged to be in contact with the transmissive glass plate 924R which does not change the polarization direction. In FIG. 12, the second polarizing plate 922R is provided to be separated from the other elements. However, the second polarizing plate 922R may be arranged to be in contact with a light output surface of the liquid crystal panel 920R or a light incident surface of the cross dichroic prism 912.

The light paths of the G-light and the B-light are reflected at the R-light transmission dichroic mirror 906R to be bent 90 degrees. The G-light and the B-light whose light paths have been bent enter a B-light transmission dichroic mirror 906G. The B-light transmission dichroic mirror 906G reflects the G-light but transmits the B-light. The G-light reflected at the B-light transmission dichroic mirror 906G enters the G-light liquid crystal optical-modulation device 910G. The G-light liquid crystal optical-modulation device 910G is a transmissive liquid crystal device configured to modulate the G-light based on an image signal. The G-light liquid crystal optical-modulation device 910G includes the liquid crystal panel 920G, a first polarizing plate 921G, and a second polarizing plate 922G.

The G-light incident on the liquid crystal optical-modulation device 910G is converted into s-polarized light. The s-polarized light incident on the G-light liquid crystal optical-modulation device 910G passes through the first polarizing plate 921G as is and enters the liquid crystal panel 920G. The s-polarized light incident on the liquid crystal panel 920G is converted into p-polarized G-light through modulation based on an image signal. The G-light converted into the p-polarized light through the modulation at the liquid crystal panel 920G emerges from the second polarizing plate 922G. In this way, the G-light modulated by the G-light liquid crystal optical-modulation device 910G enters the cross dichroic prism 912.

The B-light passing through the B-light transmission dichroic mirror 906G enters the B-light liquid crystal optical-modulation device 910B via the two relay lenses 908 and the two reflecting mirrors 907.

The B-light liquid crystal optical-modulation device 910B is a transmissive liquid crystal device configured to modulate the B-light based on an image signal. The B-light liquid crystal optical-modulation device 910B includes a λ/2 retardation plate 923B, a glass plate 924B, a first polarizing plate 921B, the liquid crystal panel 920B, and a second polarizing plate 922B.

The B-light incident on the liquid crystal optical-modulation device 910B is converted into s-polarized light. The s-polarized light incident on the B-light liquid crystal optical-modulation device 910B is converted into p-polarized light by the λ/2 retardation plate 923B. The B-light converted into the p-polarized light passes through the glass plate 924B and the first polarizing plate 921B as is and enters the liquid crystal panel 920B. The p-polarized light incident on the liquid crystal panel 920B is converted into s-polarized B-light through modulation based on an image signal. The B-light concerted into the s-polarized light through the modulation at the liquid crystal panel 920B emerges from the second polarizing plate 922B. The B-light modulated by the B-light liquid crystal optical-modulation device 910B enters the cross dichroic prism 912.

In this way, the R-light transmission dichroic mirror 906R and the B-light transmission dichroic mirror 906G, which constitute the color split guide optical system 902, split the light output from the light source device 901 into the R-light as the first color light, the G-light as the second color light, and the B-light as the third color light.

The cross dichroic prism 912, which is a color combination optical system, includes two dichroic films 912a and 912b which are arranged to cross each other in an X shape. The dichroic film 912a reflects the B-light but transmits the G-light. The dichroic film 912b reflects the R-light but transmits the G-light. In this way, the cross dichroic prism 912 combines the R-light, the G-light, and the B-light which have been modulated by the R-light liquid crystal optical-modulation device 910R, the G-light liquid crystal optical-modulation device 910G, and the B-light liquid crystal optical-modulation device 910B, respectively.

The projection optical system 914 projects the light combined by the cross dichroic prism 912 onto a screen 916. As a result, a full-color image is displayed on the screen 916. In this way, the liquid crystal display device 10 described above is applicable to the projector 900 as one example.

The liquid crystal display device 10 described above may be used for a front projection projector which projects a projection image from the viewer side or a rear projection projector which projects a projection image from the side opposite to the viewer side.

An electronic apparatus using the liquid crystal display device 10 is not limited to the projector 900. The liquid crystal display device 10 may be used for displays of information terminal devices, such as a projection head-up display (HUD), a direct-viewing head-mount display (HMD), an electronic book, a personal computer, a digital still camera, a liquid crystal display television, a video camcorder with a viewfinder or a direct-viewing monitor, a car navigation system, an electronic digital assistance, and a point-of-sale (POS) system.

The entire disclosure of Japanese Patent Application No. 2017-144966, filed Jul. 26, 2017 is expressly incorporated by reference herein.

What is claimed is:

1. A liquid crystal device comprising:
    an element substrate including a pixel electrode, a lens, and a light-shielding member, the light-shielding member defining an opening area of a pixel;
    a counter substrate including a common electrode, the counter substrate including no light-shielding member defining the opening area of the pixel;
    a liquid crystal layer interposed between the counter substrate and the element substrate; and
    an optical compensation member arranged on a counter substrate side with respect to the liquid crystal layer, wherein
    incident light is incident from the counter substrate side.

2. The liquid crystal device according to claim 1, wherein
    the counter substrate includes a light-transmissive base material arranged on a side opposite to the liquid crystal layer with respect to the common electrode, and
    the optical compensation member is arranged on a side opposite to the liquid crystal layer with respect to the base material.

3. The liquid crystal device according to claim 2, wherein
    the optical compensation member is arranged to be separated from the base material.

4. The liquid crystal device according to claim 2, wherein
    the optical compensation member is arranged to be in contact with the base material.

5. The liquid crystal device according to claim 1, further comprising:
    a dust-proof member arranged on a side opposite to the liquid crystal layer with respect to the counter substrate, wherein
    the optical compensation member is provided on a surface of the dust-proof member.

6. The liquid crystal device according to claim 1, wherein
    the counter substrate includes a light-transmissive base material arranged on a side opposite to the liquid crystal layer with respect to the common electrode, and
    the optical compensation member is provided in the counter substrate, the optical compensation member being arranged on a side of the liquid crystal layer with respect to the base material.

7. The liquid crystal display device according to claim 1, wherein a surface of the lens is curved over an entirety of the opening area.

8. The liquid crystal display device according to claim 1, wherein
    the lens is convex toward a side of the liquid crystal layer or convex toward a side opposite to the liquid crystal layer.

9. The liquid crystal display device according to claim 1, wherein
    the lens is a spherical lens or an aspherical lens.

10. The liquid crystal display device according to claim 1, wherein
    the lens is arranged on a liquid crystal layer side with respect to the light-shielding member.

11. The liquid crystal display device according to claim 1, wherein
    the optical compensation member includes at least one of a C-plate, an O-plate, or an A-plate.

12. An electronic apparatus comprising:
    a liquid crystal device including
    an element substrate including a pixel electrode, a lens, and a light-shielding member for defining an opening area of a pixel;

a counter substrate including a common electrode, the counter substrate including no light-shielding member defining the opening area of the pixel;
a liquid crystal layer interposed between the counter substrate and the element substrate; and
an optical compensation member arranged on a counter substrate side with respect to the liquid crystal layer, wherein
incident light is incident from the side of the counter substrate.

* * * * *